(12) United States Patent
Deiringer et al.

(10) Patent No.: US 8,808,846 B2
(45) Date of Patent: Aug. 19, 2014

(54) VINYL CHLORIDE POLYMER FILM AND METHOD FOR PRODUCING SAME

(75) Inventors: Guenther Deiringer, Kastl (DE); Bernd Schmidt, Gackenbach (DE); Sascha Juergens, Eppenrod (DE)

(73) Assignee: Kloechner Pentaplast GmbH & Co. KG, Heiligenroth (DE)

( * ) Notice: Subject to any disclaimer, the term of this patent is extended or adjusted under 35 U.S.C. 154(b) by 101 days.

(21) Appl. No.: 13/389,531

(22) PCT Filed: Aug. 4, 2010

(86) PCT No.: PCT/EP2010/004779
§ 371 (c)(1),
(2), (4) Date: Feb. 16, 2012

(87) PCT Pub. No.: WO2011/018182
PCT Pub. Date: Feb. 17, 2011

(65) Prior Publication Data
US 2012/0141761 A1   Jun. 7, 2012

(30) Foreign Application Priority Data
Aug. 12, 2009  (DE) .................. 10 2009 037 253

(51) Int. Cl.
B29C 55/00   (2006.01)
B32B 3/00   (2006.01)
B29C 47/00   (2006.01)
C08L 27/06   (2006.01)
C08L 67/00   (2006.01)
C08J 5/18   (2006.01)

(52) U.S. Cl.
CPC ................ *C08J 5/18* (2013.01); *C08J 2327/06* (2013.01)
USPC ............. 428/220; 525/55; 525/190; 524/567; 524/539; 264/119

(58) Field of Classification Search
None
See application file for complete search history.

(56) References Cited

U.S. PATENT DOCUMENTS

2008/0206535 A1*  8/2008  Grigo et al. .................. 428/220

FOREIGN PATENT DOCUMENTS

EP         1 066 339 B1    10/2003

* cited by examiner

*Primary Examiner* — Ling Choi
*Assistant Examiner* — Catherine S Branch
(74) *Attorney, Agent, or Firm* — ProPat, L.L.C.

(57) ABSTRACT

The invention relates to a film made of a vinyl chloride polymer mixture that, in addition to the conventional additives, contains 0.1 to less than 5 wt % of a semicrystalline or amorphous polyester, has a good thermal formability, and is suitable for the packaging of bulk goods. The film is produced by extruding or by calendering the plastified vinyl chloride polymer mixture, optionally followed by inline/offline stretching and, optionally, thermally formed immediately thereafter.

21 Claims, 4 Drawing Sheets

VINYL CHLORIDE POLYMER FILM AND METHOD FOR PRODUCING SAME

CROSS-REFERENCE TO RELATED APPLICATIONS

This application is being filed under Rule 1.371 as a National Stage Application of pending International Application No. PCT/EP2010/004779 filed Aug. 4, 2010, which claims priority to the following parent application: German Patent Application No. 10 2009 037 253.9, filed Aug. 12, 2009. Both International Application No. PCT/EP2010/004779 and German Patent Application No. 10 2009 037 253.9 are hereby incorporated by reference herein in their entirety.

FIELD OF THE INVENTION

The invention relates to a film and thermoformed items therefrom, composed of a mixture of vinyl chloride polymer, polyester, and additives, and also to a process for producing the film.

BACKGROUND OF THE INVENTION

The expression "vinyl chloride polymer", abbreviated to "VCP" here and hereinafter, designates vinyl chloride homopolymers, vinyl chloride copolymers, and also mixtures of the above polymers. In particular, the expression "VCP" covers
  polyvinyl chlorides (PVC) produced via homopolymerization of vinyl chloride, and
  vinyl chloride copolymers which are formed via polymerization of vinyl chloride with one or more comonomers, such as ethylene, propylene, or vinyl acetate.

The expression "film" here and hereinafter covers separate pieces of a film, and also industrially produced film webs with lengths of from some hundreds of meters up to some thousands of meters.

The film of the invention is produced by plastifying and then extruding a mixture comprising vinyl chloride polymer, polyester, and additives—hereinafter termed VCP mixture—through a die, or by calendering, and can be further processed inline and/or offline. The film is particularly suitable for thermoforming complex-shape packaging.

Polyester films and VCP films are known in the prior art.

The patent EP 1 066 339 B1 (whose United States equivalents are U.S. Pat. Nos. 6,551,699 B1 and 6,068,910) of Eastman Chemical Company (Tennessee, USA) describes a process for producing a film or a sheet made of a polyester resin composition by calendering. The polyester component of the resin is an amorphous or semicrystalline polyester which has a crystallization halflife time of at least 5 min from the molten state. The polyester component or the polyester is one selected from polyesters composed of (i) diacid moiety components and (ii) diol moiety components. The polyester here is composed of (i) at least 80 mol % of a diacid moiety component selected from terephthalic acid, naphthalenedicarboxylic acid, 1,4-cyclohexanedicarboxylic acid, isophthalic acid, and mixtures thereof, and (ii) from 80 to 100 mol % of a diol moiety component selected from diols having from 2 to 10 carbon atoms and mixtures thereof and from 0 to 20 mol % of a modifying diol selected from 1,3-propanediol, 1,4-butanediol, 1,5-pentanediol, 1,6-hexanediol, 1,8-octanediol, 2,24-trimethyl-1,3-pentanediol, propylene glycol, 2,2,4,4-tetramethyl-1,3-cyclobutanediol; where the diacid moiety component is based on 100 mol % of diacid moiety and the diol moiety is based on 100 mol % of diol moiety. The resin composition of EP 1 066 339 B1 also comprises an additive which is an internal lubricant or antislip agent, or a mixture thereof. The amount added of the additive is from 0.01 to 10% by weight, based on the total weight of the resin composition. Amorphous or semicrystalline polyester resin compositions have good suitability for conventional calendering processes. Films or sheets of uniform shape can be produced via calendering of polyester resin compositions of this type. The polyester resin compositions are marketed by way of example as CADENCE® by Eastman Chemical Company. They are usually used as main component for producing polyester films, where their proportion, based on the total weight of the polyester films, is generally above 96% by weight.

VCP films are produced from VCP compositions or VCP mixtures which respectively comprise various additives or modifiers which give the films a particular property profile. The prior art discloses VCP mixtures or VCP films which are respectively deformable when heated and are suitable for a wide variety of applications, for example as packaging films, shrink films, and rigid films. With the aim of influencing the properties of VCP films in a controlled manner, additives are added in order to increase impact resistance and heat resistance, processing aids are added in order to improve processability and production plant output, lubricants are added in order to improve gelling behavior during manufacture, matting agents are added to reduce gloss, and in particular flow aids are added in order to improve thermoformability and orientability. The proportions by weight of the individual additives depend on requirement and are from 0.1 to above 40% by weight. In order to improve the flowability, the thermoformability, and the orientability of VCP mixtures it is preferable to use amounts of at least 5 to more than 50% by weight of vinyl chloride copolymers. Further additives used comprise polymers of acrylonitrile-butadiene-styrene, methyl methacrylate-butadiene-styrene, methyl methacrylate-acrylonitrile-butadiene-styrene, methyl methacrylate and chlorinated polyethylene, polymethyl methacrylate and ethylene-vinyl acetate as impact-resistance components in an amount of from 1 to 20% by weight, based on the weight of the VCP film. VCP mixtures for films use conventional lubricants, e.g. fatty acids, fatty alcohols, fatty acid amides, metal soaps, esters of fatty acids with mono- or polyhydric alcohols, esters of dicarboxylic acids with mono- or polyhydric alcohols, esters of fatty acids and dicarboxyolic acids with polyhydric alcohols, the materials known as mixed esters or complex esters, esters of phthalic acid with mono- or polyhydric alcohols, or natural or synthetic waxes. The amount of lubricants is from 0.1 to 2% by weight, based on the total weight of the VCP mixture. Known heat stabilizers are organotin stabilizers, in particular tin carboxylates, tin mercaptides, and tin thioglycolates. It is also possible to use metal stabilizers based on calcium and zinc, and other metal-free organic stabilizers, and inorganic stabilizers, for example chlorine scavengers based on dihydrotalcite. The proportion of heat stabilizers is generally from 0.3 to 5% by weight, based on the total weight of the VCP mixture.

However, the use of vinyl chloride copolymers as flow aids in order to improve the thermoformability and orientability of PVC films or of VCP films reduces thermal stability, increases the tendency of the plastified VCP mixture to stick, and reduces the heat resistance of the films produced therefrom. These disadvantageous effects are known and are compensated by using complex additive formulations which are attended by considerable logistics cost in manufacturing.

SUMMARY OF ADVANTAGEOUS EMBODIMENTS OF THE INVENTION

The object of the present invention consists in providing a VCP film which has good thermoformability and which can be produced with simple additive formulations on an industrial scale.

DETAILED DESCRIPTION OF ADVANTAGEOUS EMBODIMENTS OF THE INVENTION

Figure 1:
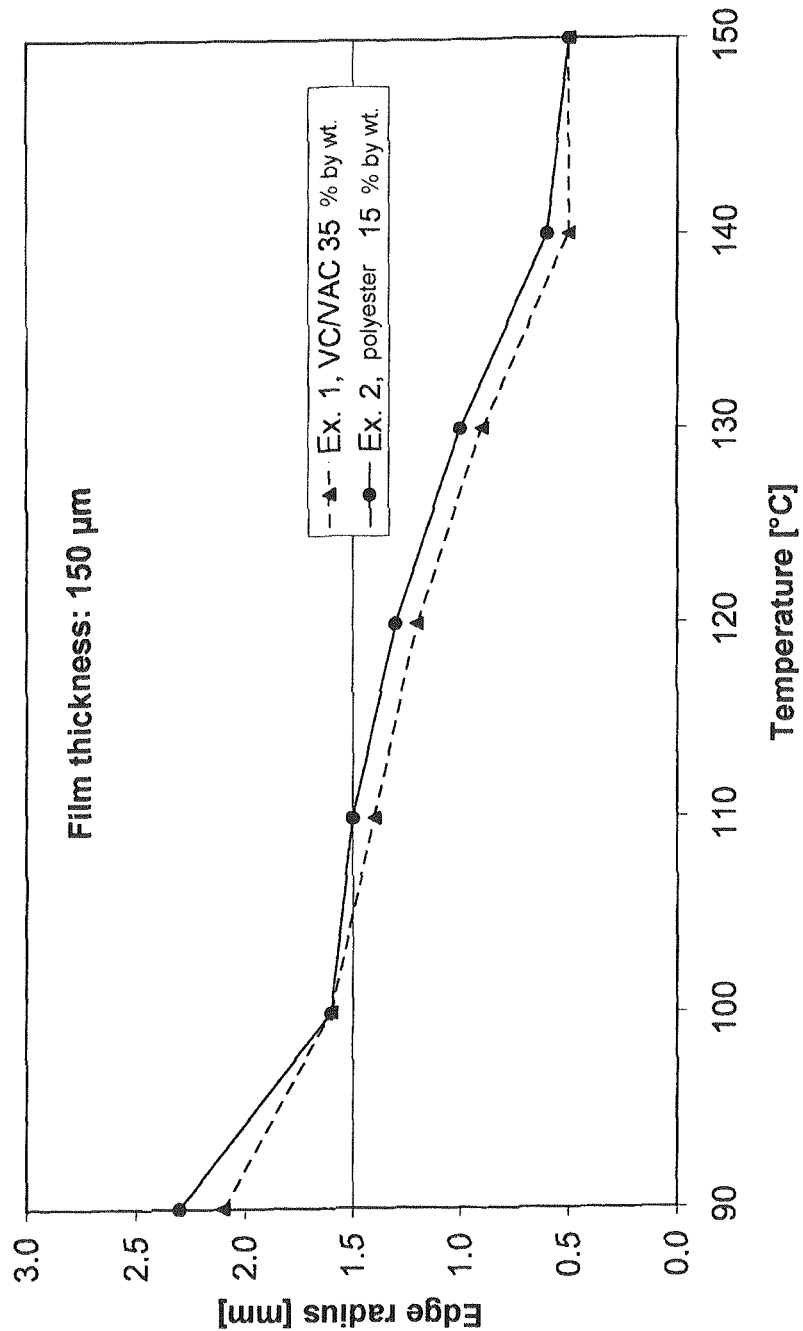
FIGS. 1 through 3 are graphical illustrations of the edge radius measured in comparative films and exemplary inventive films over a range of thermoforming temperatures.

This object is achieved via a film made of a VCP mixture, comprising from 70 to 97% by weight of one or more vinyl chloride polymers with K values from 50 to 90; from 2 to 25% by weight of additives from the group comprising modifiers, high-molecular-weight polymers, stabilizers, waxes, antiblocking agents, colorants, plasticizers, processing aids, and from 0.1 to less than 5% by weight of a semicrystalline or amorphous polyester with a crystallization halflife time in the molten state of at least 5 minutes, where the proportions by weight are based on the total weight of the VCP mixture.

Preferred embodiments of the invention are characterized in that:
- the thickness of the film in unoriented state is from 30 μm to 1200 μm;
- the thickness of the film in oriented state with a degree of stretching of from 1.3 to 4.0 is from 20 μm to 800 μm;
- the degree of stretching of the film is from 2 to 3;
- the thickness of the film in oriented state is from 20 to 200 μm;
- the edge radius of the film at a temperature of 100° C. is in the range from 0.5 to 4.0 mm;
- the edge radius of the film at a temperature of 100° C. is in the range from 1.4 to 1.8 mm;
- the dimensional change of the oriented film through shrinkage at a temperature of 75° C. in the direction of stretching is from 20 to 70%;
- the dimensional change of the oriented film through shrinkage at a temperature of 95° C. in the direction of stretching is from 35 to 80%; and
- the film comprises recycled, amorphous or semicrystalline polyester.

The prior art usually uses an amount of at least 5 to more than 50% by weight of vinyl chloride/vinyl acetate copolymer as flow aid for producing VCP films. The inventors of the present application have now established in experiments that amorphous or semicrystalline polyesters are likewise suitable as flow aids for VCP films, and even a small amount of less than 5% by weight of this type of polyester can achieve good thermoformability which is measurably better than the thermoformability of films without said addition. Surprisingly, it has been found that addition of an amorphous or semicrystalline polyester gives thermoformability which corresponds to the thermoformability of a VCP film which comprises, instead of the polyester, from 2 to 3 times the proportion by weight of vinyl chloride/vinyl acetate copolymer.

The invention therefore provides a VCP film with good thermoformability which comprises no vinyl chloride/vinyl acetate copolymer or which comprises a reduced proportion of this additive. In particular, a PVC film is provided which is entirely free from vinyl chloride/vinyl acetate copolymer and which is suitable for producing thermoformed packaging on an industrial scale.

The orientation of films is achieved by using temperatures and degrees of stretching which are similar to those in the thermoforming process. Accordingly, the film of the invention also has good orientability.

Polyester additive used for the VCP films of the invention comprises commercially available amorphous, non-crystallizable polyesters, such as CADENCE® or EMBRACE® from Eastman Chemical Company. A feature of polyesters of this type is that they have, in the molten state, a crystallization halflife time of at least 5 min. In particular, these polyesters are composed of (i) diacid moiety components and (ii) diol moiety components constituted as follows:

(i) at least 80 mol % of a diacid moiety component selected from terephthalic acid, naphthalenedicarboxylic acid, 1,4-cyclohexanedicarboxylic acid, isophthalic acid, and mixtures thereof, and (ii) from 80 to 100 mol % of a diol moiety component selected from diols having from 2 to 10 carbon atoms and mixtures thereof and from 0 to 20 mol % of a modifying diol selected from 1,3-propanediol, 1,4-butanediol, 1,5-pentanediol, 1,6-hexanediol, 1,8-octanediol, 2,24-trimethyl-1,3-pentanediol, propylene glycol, 2,2,4,4-tetramethyl-1,3-cyclobutanediol, where the diacid moiety component is based on 100 mol % of diacid moiety and the diol moiety is based on 100 mol % of diol moiety.

The amorphous or semicrystalline polyester is added to the VCP mixture in the form of powder, of pellets, or of granulated material.

It is moreover also possible in the invention to use an amorphous or semicrystalline polyester in the form of regrind. Regrind is obtained from returned material (recyclate) arising during production of polyester films which comprise a high proportion of more than 80% by weight of an amorphous or semicrystalline polyester. It is possible here to use coarse ground material with a grain size greater than 3 mm and/or fine ground material with a grain size smaller than 3 mm, recompacted ground material (for example from the Condux® process), or else regranulated ground material. Regranulated ground material is obtained through a process in which plastified returned material is forced through a filter, extruded through a perforated plate, and chopped to give granulated material. The above treatment process causes slight degradation of the amorphous or semicrystalline polyester, measurable by taking the intrinsic viscosity (IV). In particular instances, the degradation of the polyester can promote the gelling of the VCP mixture and improve the optical quality of the film.

EP 0 1 066 339 B1 describes the measurement of the crystallization halflife time of polyester. Accordingly, the crystallization halflife time is determined by using a digital scanning calorimeter (DSC). DSC is a standard method for measuring thermal properties, in particular the phase transition temperatures of solids. For the purposes of the present invention, the crystallization halflife time is determined by taking 15.0 mg of the polyester requiring testing, heating it to 290° C., and then cooling it in the presence of helium at a rate of 320° C. per minute and detecting the time that elapses before the isothermal crystallization temperature or the crystallization peak of the DSC curve is reached. The progress of crystallization as a function of time is used to determine the crystallization halflife time. The crystallization halflife time is the time which, after the initial phase of the crystallization process, is required in order to obtain 50% of the maximum achievable crystallinity in the specimen, at the given temperature.

The additives of the VCP mixture are additives selected from the group comprising modifiers, preferably high-molecular-weight polymers, stabilizers, waxes, antiblocking agents, colorants, plasticizers, and processing aids.

To the extent that the film of the invention comprises vinyl chloride copolymers, the copolymer preferably comprises, as comonomer, a proportion of from 1 to 45%, based on the weight of the vinyl chloride copolymer, of ethylene, propylene, or vinyl acetate.

Films of the invention are obtained by extruding or calendering the plastified VCP mixture to give an unoriented film of thickness from 50 to 1000 µm. The film thus obtained can be used directly as it stands or can be thermoformed or oriented in a process step that follows directly (inline and/or offline).

In one embodiment, the VCP mixture comprises from 70 to 87% by weight of polyvinyl chloride, based on the total weight of the VCP mixture, with a K value of 60. By way of example, from 5 to 10% by weight, based on the VCP mixture, of a methyl methacrylate-butadiene-styrene copolymer is used as modifier for tensile impact resistance. The VCP mixture of the invention comprises a small amount of processing aid, for example from 0.5 to 2% by weight of a methyl methacrylate-acrylate-styrene copolymer, based on the VCP mixture, in particular 1% by weight. Other materials present are, as heat stabilizer, more than 70% of an organotin-sulfur stabilizer, such as dioctyltin bis(2-ethylhexyl 1-thioglycolate) and less than 30% by weight of monooctyltin tris(2-ethylhexyl 1-thioglycolate), based in each case on the amount of the stabilizer. The proportion of the stabilizer based on the VCP mixture is from 1 to 2% by weight, in particular 1.5% by weight.

Lubricants used are preferably mixtures of complex and glycerol esters, or else are saturated, unbranched aliphatic monocarboxylic acids, such as palmitic and stearic acid. The effective amount of lubricant is usually from 0.1 to 2.5% by weight, in particular from 0.3 to 1.5% by weight, based on the total weight of the VCP mixture. The second essential constituent of the VCP mixture of the invention is a semicrystalline or amorphous polyester, the amount of which used is from 0.1 to <5% by weight, based on the VCP mixture. This polyester involves a commercially available product from Eastman Chemical Company, as described in the European patent EP 1 066 339 B1. This polyester constituent of the VCP mixture of the invention replaces to some extent or completely the conventional copolymer of vinyl chloride and vinyl acetate. An amount of from 0.1 to 0.5% by weight, in particular 0.2% by weight, based on the amount of VCP mixture, of kaolin or chalk is usually added as antiblocking agent.

The VCP mixture can also, of course, be covered with the aid of appropriate colorants or dies, and white coloring here is preferably achieved with titanium dioxide and/or chalk. It is also possible to add antimony trioxide as flame retardant and quaternary ammonium salt as preferred antistatic agent. Conventional processing aids can also be added. The VCP mixture used as starting material for producing the films of the invention is achieved via mixing a proportion of from 70 to 97% by weight of a polyvinyl chloride or vinyl chloride polymer which take the form of powder, of pellets, or of granulated material and which have a K value of from 50 to 90 with a proportion of from 2 to 25% by weight of additives, based in each case on the total weight of the VCP mixture, via addition of a proportion of from 0.1 to <5% by weight, based on the VCP mixture, of a semicrystalline or amorphous polyester which takes the form of powder, of pellets, or of granulated material. The VCP mixture is plastified and melted and, during the calendering process, spread by the action of rolls to give a film via passage through a pressurized gap between two calender rolls of a roll calender, where the temperature of the calender rolls is from 150 to 250° C. The process used here is one that is known for vinyl chloride polymer: rolling-bank calendering. The rolls of the 4- to 6-roll calender are generally highly polished hard-chromed rolls, and prior to each nip a rotating body of kneaded material forms, and is termed a rolling bank. The calendered film is taken off from the final calender roll, and is cooled by means of cooling rolls, and wound up. There can then also be an inline and/or offline process step, for example a thermoforming process or a stretching process, longitudinally and/or transversely, with a degree of stretching of from 1.3 to 7. During this process the film becomes thinner and becomes capable of shrinkage (high dimensional change values in the direction of stretching).

The thickness of the film is generally from 100 to 1000 µm, and the film is stretched if necessary with a degree of stretching of from 1.3 to 7 to thickness values of, for example, from 20 to 250 µm. The degree of stretching is the quotient calculated from the thickness of the film prior to the orientation process and the thickness of the film after the stretching procedure, and is preferably from 3 to 4. The thicknesses of films obtained are therefore from 20 to 250 µm and preferably from 35 to 200 µm.

Another object of the invention is to provide a process for producing a thermoformable film.

This object is achieved via a process comprising the following steps:
(a) mixing a proportion of from 70 to 97% by weight of one or more vinyl chloride polymers which take the form of powder, of pellets, or of granulated material and which have a K value of from 50 to 90 with a proportion of from 2 to 25% by weight of additives from the group comprising modifiers, high-molecular-weight polymers, stabilizers, waxes, antiblocking agents, colorants, plasticizers, and processing aids, and a proportion of from 0.1 to less than 5% by weight of a semicrystalline or amorphous polyester which takes the form of powder, of pellets, or of granulated material and which has a crystallization halflife time in the molten state of at least 5 min, where the proportions by weight are based on the total weight of the mixed components;
(b) plastifying and melting the VCP mixture obtained in step (a);
(c) calendering or extruding the molten VCP mixture at temperatures from 150 to 250° C., in order to mold a film; and
(d) orienting and/or thermoforming the film in an inline and/or offline process, where the degree of stretching during the orientation process is from 1.3 to 4, in particular from 2 to 3, longitudinally and/or transversely.

Advantageous embodiments of the process of the invention have the following features:
the average temperature of the film during the orientation process is from 70 to 120° C., in particular 100° C.;
the average temperature of the film during the thermoforming process is from 80 to 150° C., in particular 100° C.;
the VCP mixture is pregelled in a gelling assembly, on mixing rolls, or in an extruder to about 130 to 190° C., in order then to be molded via calendering to give the film;

from 70 to 87% by weight of a vinyl chloride polymer which takes the form of powder and which has a K value of from 50 to 70; from 0.1 to less than 5% by weight of a semicrystalline or amorphous polyester with a crystallization halflife time in the molten state of at least 5 min in the form of powder, of pellets, or of granulated material, and from 5 to 25% by weight of additives are mixed with one another, where the proportions by weight are based on the total weight of the resultant VCP mixture, the VCP mixture is plastified and melted, and the molten VCP mixture is extruded or calendered to give a film; and the VCP mixture uses a vinyl chloride copolymer which comprises, as comonomer, a proportion of from 1 to 45% by weight, based on the vinyl chloride copolymer, of ethylene, propylene, or vinyl acetate.

The film of the invention is used as packaging film, shrink film, furniture film, ceiling-cassette film, or card film in the form of inscribable and printable film. Since the film is thermoformable and/or orientable, it is primarily used as packaging film and as shrink film.

The invention is explained in more detail below with reference to film examples and to FIGS. 1 to 4.

The film examples set out in tables 1 and 2 below comprise comparative examples 1, 2, 3, 4, 6 and 7, and also inventive examples 5 and 8. Table 1 collates the formulations and the raw materials with source, and table 2 collates the quantitative constitution of the films, their thickness, and the edge radii obtained during the thermoforming process in the temperature range from 90 to 150° C. for comparative examples 1, 2, 3, 4, 6, and 7 and inventive examples 5 and 8.

Comparative examples 1, 4, and 7 relate to VCP films which comprise PVC as main component, a vinyl chloride-vinyl acetate copolymer (VC/VAC copolymer) as essential additional component, and also various additives. The constitution of the film of example 3 is similar but comprises no vinyl chloride-vinyl acetate copolymer. It is therefore also termed reference hereinafter. The thicknesses of the comparative films are 150, 300, and 550 µm.

The films of the invention in examples 5 and 8 comprise, instead of VC/VAC copolymer, an amorphous or semicrystalline polyester, where the proportion by weight of the polyester is smaller than that of the VC/VAC copolymer in the comparative examples. The amorphous or semicrystalline polyester involves a polyester as in the European patent EP 0 1 066 339 B1 from Eastman Chemical Company.

The curvature radius of an edge produced in the film by means of the thermoforming process serves as parameter for thermoformability. A cylindrical metal beaker is used here as mold, and has a rectangular edge at the base, the curvature radius of the basal edge of the beaker mold therefore being "zero". The beaker mold has been designed as female mold, i.e. as cylindrical recess.

The better the thermoformability of the film, the better its contact with the profile of the beaker mold, and therefore the smaller the curvature radius of the basal edge replicated in the film. The thermoformability of a film, or its flow behavior, is temperature-dependent. A film generally becomes more flowable as temperature increases, thus having better thermoformability. In order to take account of this behavior and to characterize thermoformability as comprehensively as possible, thermoformability is measured at a number of prescribed temperature values. It is thus possible to determine thermoforming behavior over a relatively wide processing range. The separation of the temperature values for measuring thermoformability is typically 5 or 10° C.

It should be noted hereinafter that the thickness of the film affects the curvature radius of the replicated edge. The curvature radius increases with increasing thickness of the film.

A film specimen of area 100 mm×100 mm is taken, in accordance with an in-house specification, from the film to be tested. The film specimen is placed on a female mold using the cylindrical beaker mold described above. The diameter of the beaker mold is 50 mm and its depth is 25 mm. The wall meets the base at right angles (curvature radius zero). A sealing ring is used around the beaker mold and the superposed film specimen to provide a vacuum-tight seal with respect to the environment.

Figure 4:
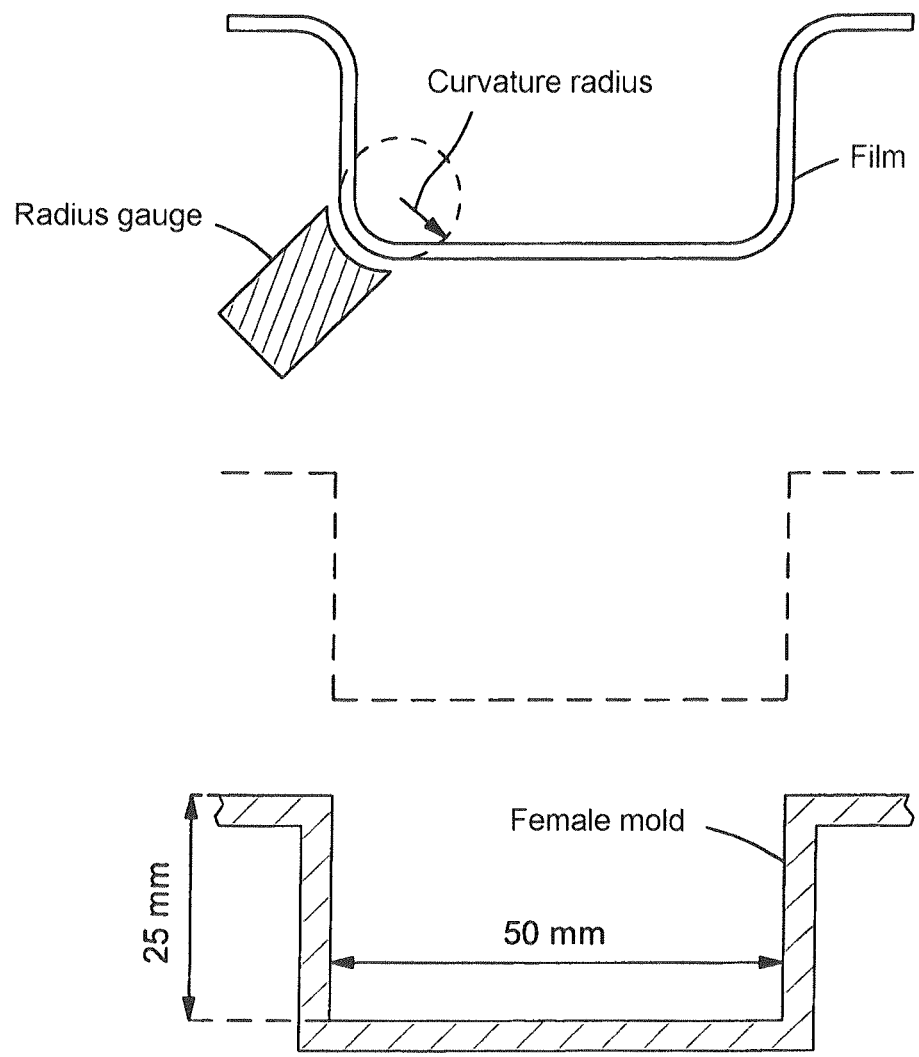
FIG. 4 is a cross-sectional schematic illustration of an exemplary mold used to form basal edge measurement specimens and subsequent positioning of the edge curvature measurement device.

The film specimen is heated by an IR source to a prescribed temperature. The temperature of the film is measured here with a radiation pyrometer, and the irradiative power of the IR source is controlled automatically so as to adjust to the prescribed temperature and avoid exceeding the setpoint value for the temperature of the film during the heating process (avoiding overshoot). As soon as the prescribed temperature has been reached, a prescribed negative pressure, relative to the pressure of the ambient atmosphere, is applied to the female mold, whereupon the film is forced into the female mold within a period of less than 1 sec. The negative pressure applied is from 0.08 to 0.12 bar, i.e. about 8 to 12% of the ambient pressure. After cooling, the film specimen thermoformed to give a beaker is removed, and the radius of the basal edge is measured, as shown in FIG. 4. It is preferable to use a finely calibrated radius gauge for the measurement. Another suitable alternative is optical measurement, where the edge is illuminated by a light source and a lens arrangement is used to magnify the image of the edge by a factor of, for example, 10:1. The image of the edge is projected horizontally by way of a 45 mirror onto a transparent radius template, and the radius is read.

It is preferable to use an industrial system for thermoforming of the film specimen, an example being a Multivac R240.

Figure 2:
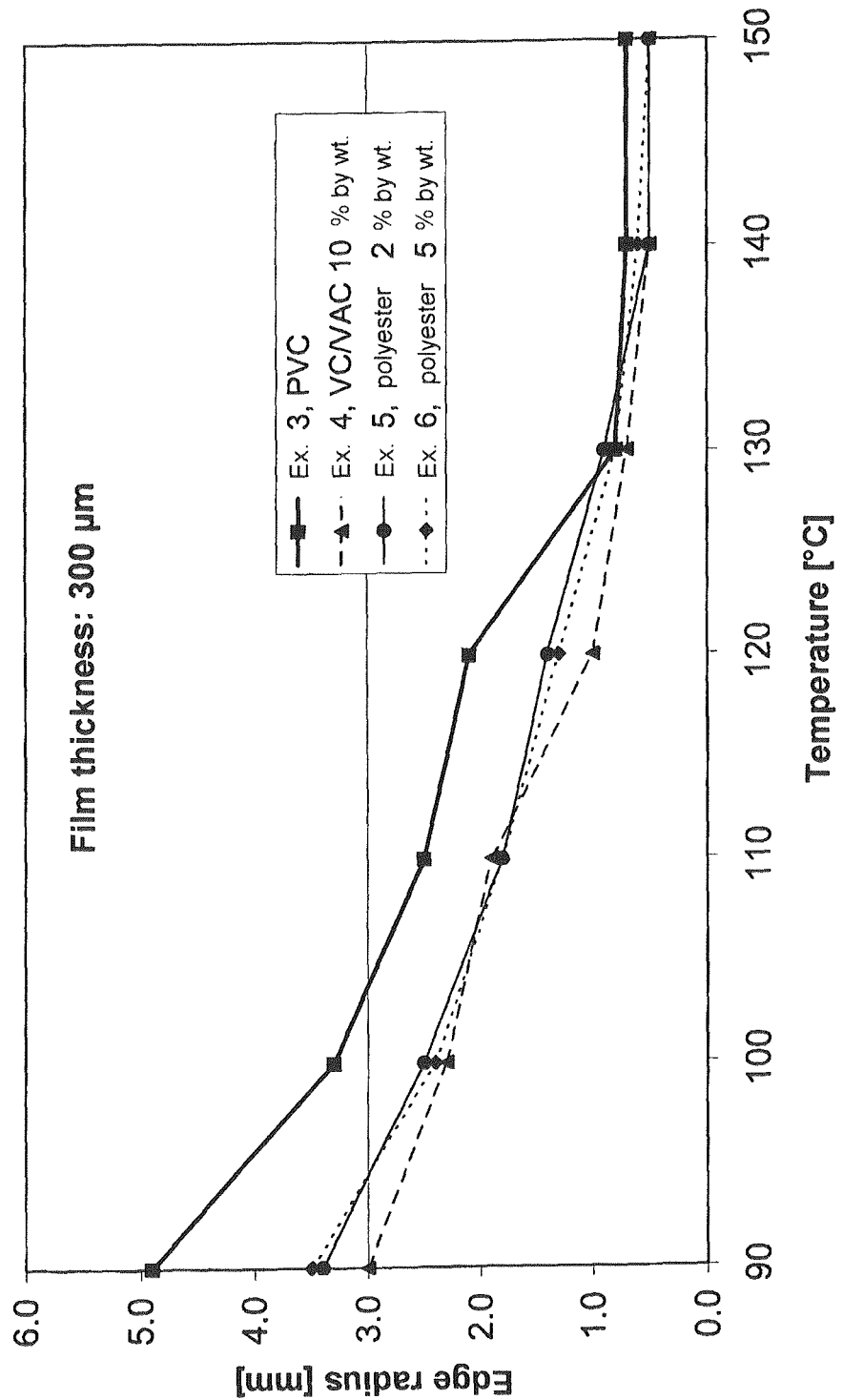
Figure 3:
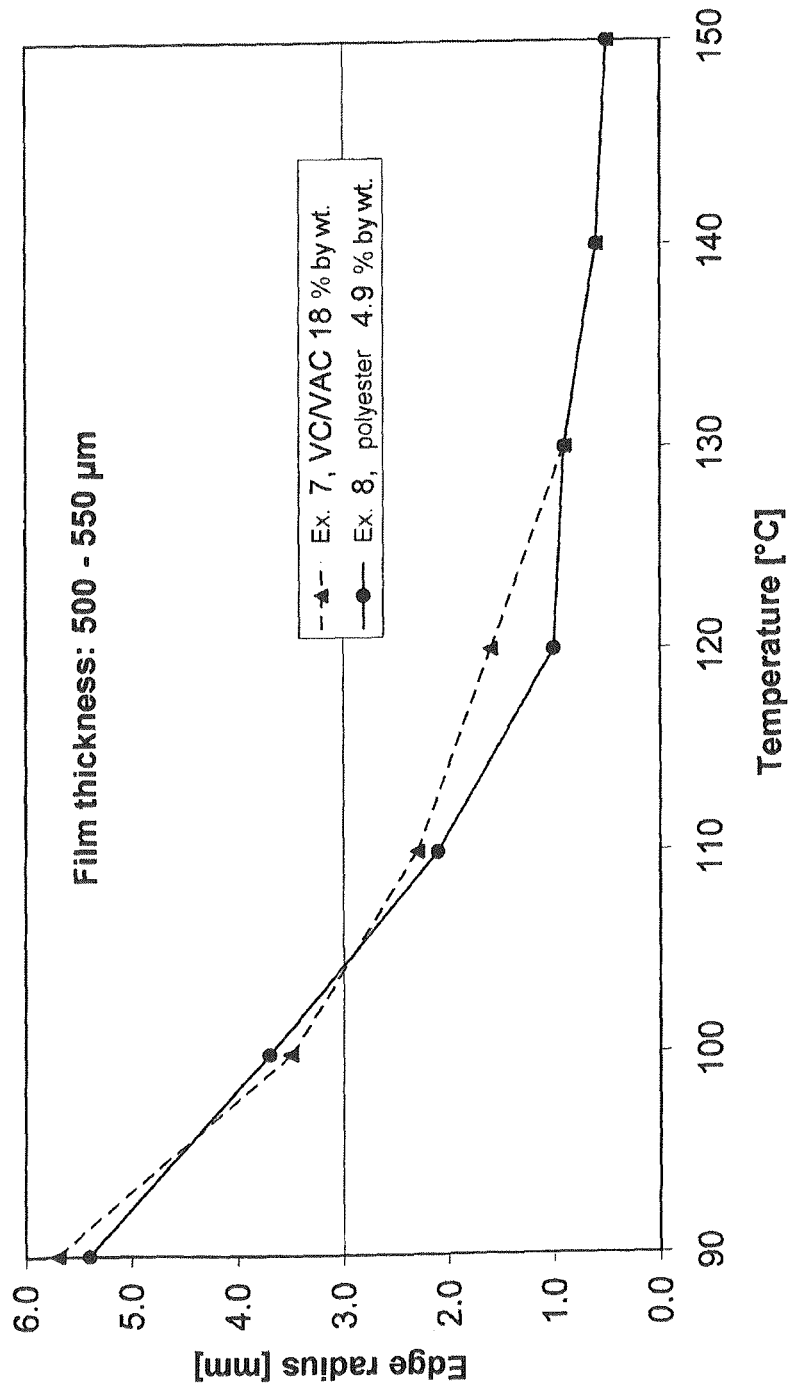

FIGS. 1 to 3 show the edge radius measured in comparative films and films of the invention at thermoforming temperatures in the range from 90 to 150° C. (in steps of 10° C.). The thickness and constitution of the film have a substantial effect on thermoformability and therefore on edge radius. In order to decouple the effect of these two features, each of FIGS. 1 to 3 shows the results of measurement on films of identical thickness (150 µm, 300 µm, 500 µm, and 550 µm). The quantitative proportion of vinyl acetate-vinyl chloride copolymer is indicated by "VC/VAC" in FIGS. 1 to 3.

FIGS. 2 and 3 show that addition of a small quantitative proportion of polyester of less than 5% by weight achieves an edge radius or thermoformability which otherwise can be achieved only by using from 2 to 3 times the amount of vinyl acetate-vinyl chloride copolymer.

The following other properties were measured on the films:
1. Thickness was determined by a method based on DIN 53370, by means of a 543/250 B indicator from Mitutoyo, Japan. For the spot measurements, the film was inserted between the open measurement surfaces of the indicator, and these were then gently closed. The thickness was read from the indicator.
2. Haze is the term used for the percentage proportion of light scattered in a forward direction, based on the total luminous flux through the film. Haze is measured by using measurement equipment developed in-house, with geometry similar to the geometry of the measurement equipment in the ASTM D1003-61 standard.
3. Tensile impact resistance: the measurement is made in accordance with DIN EN ISO 8256 longitudinally and transversely, by using a pendulum impact tester. A single pendulum impact is used here to stretch the film to the point of fracture. The energy consumed in this process is determined from the energy lost by the pendulum, after correction for inertial indicator friction and other energy losses.

4. Transverse dimensional change. This measurement is carried out in accordance with DIN 53377, by placing the film for 30 s in a water bath at a prescribed temperature of 75° C. or 95° C. The dimensional change that has occurred after this time is measured at room temperature.

5. Thermal stability: a test mixture made of PVC, additives, and other polymers is rolled out on a 2-roll mill using defined parameters, for example a roll surface temperature of 185° C., a bank temperature of 180° C., a roll speed of 6.7 m/min for roll 1 and 6.9 m/min for roll 2, and a film thickness of 400 μm. The degree of yellowing, i.e. the thermal degradation, is assessed visually as a function of time and classified qualitatively using values from 1 to 6, where the value 1 indicates little degradation and the value 6 indicates severe degradation. For documentation purposes it is also possible to take small specimens at short time intervals and place these in series on a solid substrate. Studies carried out by the above method show that VCP mixtures of the invention, comprising polyester, have higher thermal stability than conventional mixtures which merely comprise vinyl chloride/vinyl acetate copolymer. Because the VCP mixtures of the invention have improved thermal stability, the complex additive formulations essential for conventional VCP mixtures can be replaced by simple additives.

6. Thermoforming range: the thermoforming range gives the temperature range within which a film can be deformed without impairment of appearance. Within the thermoforming range, no visible defects, for example stress whitening or perforation, are permitted on a thermoformed beaker with edge radius smaller than or equal to 7 mm. A film specimen measuring 200 mm×200 mm and a female mold in the form of a beaker with diameter 150 mm and height 100 mm are used to thermoform a beaker under defined conditions for measurement of edge radius in accordance with an in-house specification described above. The thermoformability values determined by this method are given in table 2 and show that the use of polyester in the invention has an advantageous effect on the thermoforming behavior of the films. In particular, table 2 shows that the thermoforming range of the films of the invention (examples 5, 6, 8) is comparable with the thermoforming range of films of the comparative examples 1, 4, 7).

7. The K value of the vinyl chloride polymers is an index which correlates with the average degree of polymerization or the average molecular weight, and which is adjusted in a known manner by conducting the polymerization process within a prescribed temperature range, and/or by adding polymerization regulators. The K value of the vinyl chloride polymer is determined in accordance with DIN 53 726, where the vinyl chloride polymer is dissolved in cyclohexanone.

Table 2 also shows that the films of the invention (example 5) have lower haze than the films of comparative examples 1 and 4. Furthermore, the transverse tensile impact resistance of the films of the invention (example 5) is higher than that of the films of comparative examples 1 and 4, where these comprise VC/VAC copolymer. The same is also true for the film of comparative example 2, comprising 15% by weight of polyester.

The quantitative proportion of the polyester in the films of the invention is relatively small in comparison with the proportion of VC/VAC copolymer in the comparative examples. In the case of the film of example 2 with a quantitative proportion of only 15% by weight of polyester, the transverse dimensional change at 95° C. is almost identical with the dimensional change of the film of example 1, which comprises 35% by weight of VC/VAC copolymer as flow aid.

TABLE 1

| | Example number | |
|---|---|---|
| | 1, 3, 4, 7 (Comparative examples) | 2, 5*, 6, 8* (* Invention) |
| PVC | VINNOLIT S 3160 (Vinnolit) | VINNOLIT S 3160 (Vinnolit) |
| Impact modifier | KANE ACE B 580 (Kaneka) | KANE ACE B 580 (Kaneka) |
| Processing aid | Paraloid K175 (R & H) | Paraloid K120 N (R & H) |
| Heat stabilizer | THERMOLITE 890F (Arkema) | THERMOLITE 890F (Arkema) |
| Waxes and lubricants | Mixture of: Ligalub 74 KE (Greven Fett Chemie) Pisterene 4900 (Unichema) | Mixture of: Ligalub 74 KE (Greven Fett Chemie) Pisterene 4900 (Unichema) |
| VC/VAC copolymer | VINNOLIT S 3157/11 (Vinnolit) | VINNOLIT S 3157/11 (Vinnolit) |
| Polyester | — | Cadence (Eastman) |

TABLE 2

| | Example number | | | | | | | |
|---|---|---|---|---|---|---|---|---|
| | 1 | 2 | 3 | 4 | 5* | 6 | 7 | 8* |
| PVC [% by wt.] | 53.3 | 73.3 | 88.9 | 78.9 | 86.8 | 83.8 | 73.5 | 85.5 |
| Impact modifier [% by wt.] | 7.0 | 7.0 | 7.5 | 7.5 | 7.5 | 7.5 | 5.5 | 5.5 |
| Processing aid [% by wt.] | 1.0 | 1.0 | 0.7 | 0.7 | 0.7 | 0.7 | 0.7 | 0.7 |
| Heat stabilizer [% by wt.] | 1.5 | 1.5 | 1.2 | 1.2 | 1.2 | 1.2 | 1.2 | 1.2 |
| Waxes and lubricants [% by wt.] | 2.2 | 2.2 | 1.8 | 1.8 | 1.8 | 1.8 | 1.1 | 1.1 |
| VC/VAC copolymer [% by wt.] | 35.0 | — | — | 10.0 | — | — | 18.0 | — |
| Polyester [% by wt.] | — | 15.0 | — | — | 2.0 | 5.0 | — | 4.9 |
| Thickness of film [μm] | 150 | 150 | 300 | 300 | 300 | 300 | 550 | 500 |
| Edge radius at | | | | | | | | |
| 90° [mm] | 2.1 | 2.3 | 4.9 | 3.0 | 3.4 | 3.5 | 5.7 | 5.4 |
| 100° [mm] | 1.6 | 1.6 | 3.3 | 2.3 | 2.5 | 2.4 | 3.5 | 3.7 |
| 110° [mm] | 1.4 | 1.5 | 2.5 | 1.9 | 1.8 | 1.8 | 2.3 | 2.1 |
| 120° [mm] | 1.2 | 1.3 | 2.1 | 1.0 | 1.4 | 1.3 | 1.6 | 1.0 |

TABLE 2-continued

| | Example number | | | | | | | |
|---|---|---|---|---|---|---|---|---|
| | 1 | 2 | 3 | 4 | 5* | 6 | 7 | 8* |
| 130° [mm] | 0.9 | 1.0 | 0.8 | 0.7 | 0.9 | 0.8 | 0.9 | 0.9 |
| 140° [mm] | 0.5 | 0.6 | 0.7 | 0.5 | 0.5 | 0.6 | 0.6 | 0.6 |
| 150° [mm] | 0.5 | 0.5 | 0.7 | 0.5 | 0.5 | 0.5 | 0.5 | 0.5 |
| Transverse tensile impact resistance [kJ/m$^2$] | 240 | 280 | 230 | 200 | 230 | 250 | — | — |
| Thermoforming range [° C.] | 89-105 | 92-106 | 89-98 | 86-104 | 86-102 | 84-110 | 80-100 | 84-102 |
| Haze [%] | 12 | 11 | 14 | 13 | 11 | 11 | — | — |
| Oriented film (thickness 50 μm), transversely oriented with factor 1:3 | | | | | | | | |
| Transverse dimensional change, 75° C. [%] | −36 | −33 | — | — | — | — | — | — |
| Transverse dimensional change, 95° C. [%] | −60 | −57 | — | — | — | — | — | — |

(*in accordance with invention)

What is claimed is:

1. A thermoformable and/or shrinkable film comprising a vinyl chloride polymer mixture, said vinyl chloride polymer mixture comprising from 70 to 97% by weight of one or more vinyl chloride polymers with K values from 50 to 90; from 2 to 25% by weight of additives selected from modifiers, high-molecular-weight polymers, stabilizers, waxes antiblocking agents, colorants, plasticizers, or processing aids, and an amount of from 0.1 to less than 5% by weight of a semicrystalline or amorphous polyester with a crystallization halflife time in the molten state of at least 5 minutes, where the proportions by weight are based on the total weight of the vinyl chloride polymer mixture.

2. The film as claimed in claim 1, wherein the film has a thickness in an unoriented state of from 30 μm to 1200 μm.

3. The film as claimed in claim 1, wherein the film has a thickness in an oriented state with a degree of stretching of from 1.3 to 4 of from 20 μm to 800 μm.

4. The film as claimed in claim 3, wherein the degree of stretching is from 2 to 3.

5. The film as claimed in claim 1, wherein the film has a thickness in an oriented state of from 20 to 200 μm.

6. The film as claimed in claim 1, wherein the film has an edge radius at a temperature of 140° C. ranging from 0.5 to 0.6 mm.

7. The film as claimed in claim 1, wherein the film has an edge radius at a temperature of 120° C. ranging from 1.0 to 1.4 mm.

8. The film as claimed in claim 1, wherein the film is oriented and the oriented film has a dimensional change through shrinkage at a temperature of 75° C. in the direction of stretching of from 20 to 70%.

9. The film as claimed in claim 1, wherein the film is oriented and the oriented film has a dimensional change through shrinkage at a temperature of 95° C. in the direction of stretching ranging from 45 to 80%.

10. The film as claimed in claim 1, wherein said semicrystalline or amorphous polyester is recycled polyester.

11. Packaging film, shrink film, furniture film, wallcovering film, or inscribable and printable film comprising film as claimed in claim 1.

12. A process for producing a film as claimed in claim 1 comprising the following steps:
(a) mixing a proportion of from 70 to 97% by weight of one or more vinyl chloride polymers, said vinyl chloride polymer in powder form, pellet form, or granulate material, said vinyl chloride polymers having a K value of from 50 to 90 with a proportion of from 2 to 25% by weight of additives selected from modifiers, high-molecular-weight polymers, stabilizers, waxes, antiblocking agents, colorants, plasticizers, or processing aids, and a proportion of from 0.1 to less than 5% by weight of a semicrystalline or amorphous polyester, said polyester in powder form, pellet form, or granulated material, said polyester having a crystallization halflife time in a molten state of at least 5 min, where the proportions by weight are based on the total weight of the mixed components;
(b) plastifying and melting the vinyl chloride polymer mixture obtained in step (a);
(c) calendering or extruding the molten vinyl chloride polymer mixture at temperatures from 150 to 250° C., in order to mold a film; and
(d) orienting and/or thermoforming the film in an inline and/or offline process, with a degree of stretching during the orientation process of from 1.3 to 4.0 longitudinally and/or transversely.

13. The process as claimed in claim 12, wherein the orienting step has an average temperature of the film of from 70 to 120° C.

14. The process as claimed in claim 12, wherein the thermoforming step has an average temperature of the film from 80 to 150° C.

15. The process as claimed in claim 12, wherein the vinyl chloride polymer mixture is pregelled in a gelling assembly, on mixing rolls, or in an extruder to about 130 to 190° C., in order then to be molded via calendering to give the film.

16. The process as claimed in claim 12, wherein from 70 to 87% by weight of a vinyl chloride polymer in powder form having a K value of from 50 to 70; from 0.1 to less than 5% by weight of semicrystalline or amorphous polyester with a crystallization halflife time in the molten state of at least 5 min in powder form, pellet form, or granulated material, and from 5 to 25% by weight of additives are mixed with one another, where the proportions by weight are based on the total weight of the resultant vinyl chloride polymer mixture, the vinyl chloride polymer mixture is plastified and melted, and the molten vinyl chloride polymer mixture is extruded or calendered to give a film.

17. The process as claimed in claim 12, wherein the vinyl chloride polymer mixture comprises a vinyl chloride polymer made of vinyl chloride copolymer which comprises, as comonomer, a proportion of from 1 to 45% by weight, based on the vinyl chloride copolymer, of ethylene, propylene, or vinyl acetate.

18. The process as claimed in claim 12, wherein the degree of stretching is from 2.0 to 3.0 longitudinally and/or transversely.

19. The process as claimed in claim 13, wherein the average temperature of the film during the orientation process is 100° C.

20. The process as claimed in claim 14, wherein the average temperature of the film during the thermoforming process is 100° C.

21. The film as claimed in claim 1, wherein said film does not comprise vinyl chloride/vinyl acetate copolymer and exhibits a thermoformability corresponding to that of a film comprising vinyl chloride/vinyl acetate copolymer in lieu of said polyester, with said vinyl chloride/vinyl acetate copolymer present in an amount of 2 to 3 times the amount of said polyester.

\* \* \* \* \*